J. Leeds, G.H. Oat, Jr. & A. Oat,
Spark Arrester,
Nº 9,196.                    Patented Aug. 17, 1852.
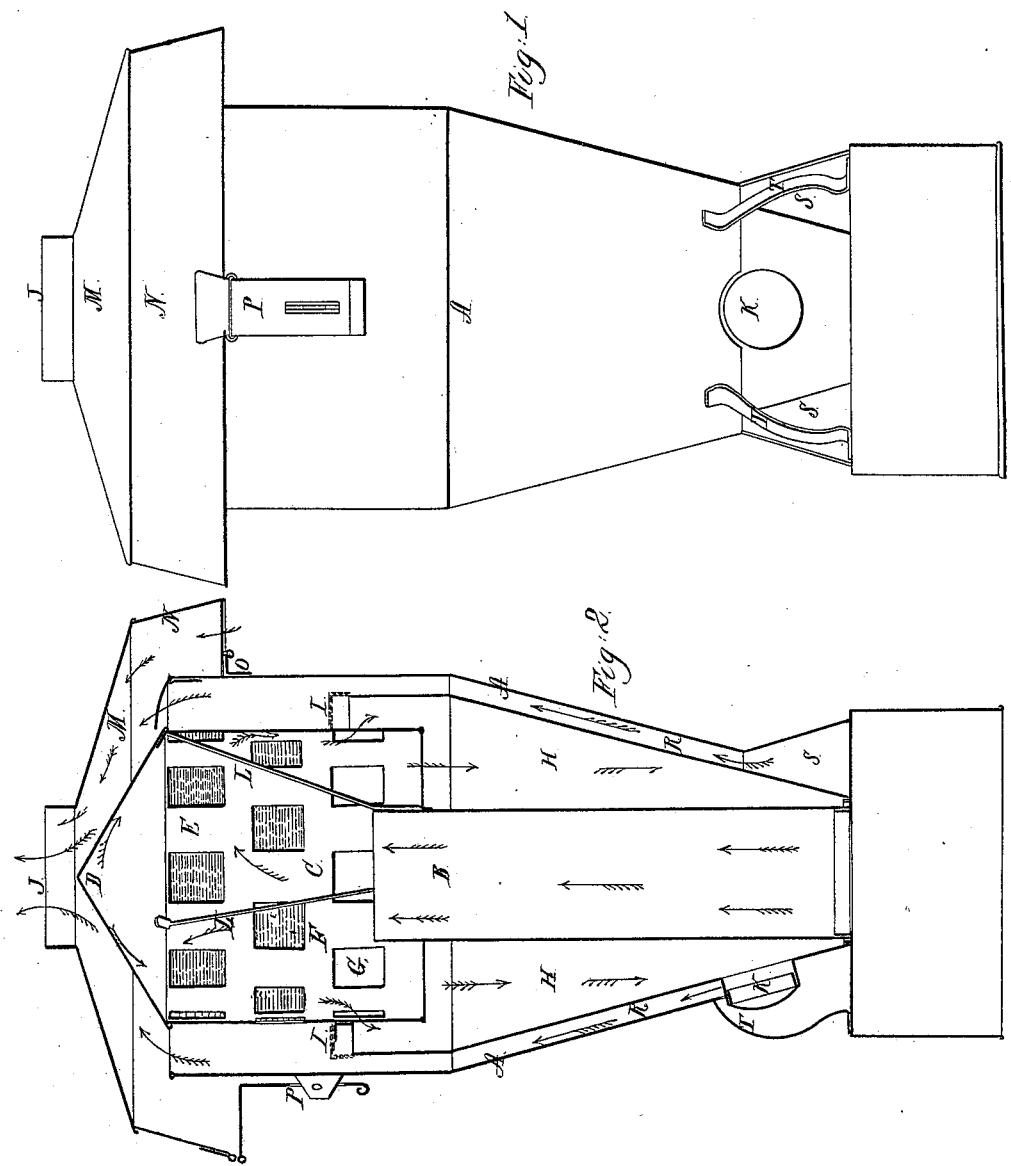

UNITED STATES PATENT OFFICE.

J. LEEDS, G. H. OAT, JR., AND A. A. OAT, OF PHILADELPHIA, PENNSYLVANIA, ASSIGNORS TO JOSEPH LEEDS.

SPARK-ARRESTER.

Specification of Letters Patent No. 9,196, dated August 17, 1852.

*To all whom it may concern:*

Be it known that we, JOSEPH LEEDS, GEORGE H. OAT, Jr., and ALFRED A. OAT, of the city and county of Philadelphia and State of Pennsylvania, have invented a certain new and Improved Draft Spark-Arrester; and we do hereby declare the following to be a full, clear, and exact description of the same, reference being had to the accompanying drawings, making a part thereof, in which—

Figure 1, represents a view from the front, and Fig. 2, a vertical section through the center thereof.

Similar letters refer to like parts.

The nature of our invention consists in surrounding the spark chamber, or that part which usually constitutes the outside of the stack, with a draft flue, which has openings below, flared or otherwise to take in the air, and which extends up above the top of the inner chimney, and may be covered by a cap or otherwise—said draft flue being for the purpose of aiding the draft of the chimney which becomes impeded by the separation of the sparks from the other products of combustion.

To enable others skilled in the art to make and use our invention we will proceed to describe the same with reference to the drawings.

A, represents the outer shell or case of the spark arrester, through the center of which passes the chimney B, extending up a short distance into the chamber C, which may be cylindrical—having a closed top D, of conical form, and the bottom open. In the shell of the chamber C, are arranged a series of openings E, F, G; the upper series E, being covered with fine wire gauze netting; the second series F, is covered with a coarser netting of similar material, and the third series G are entirely open, so that the smoke, steam and other gases may as they are thrown downward by the conical cap or top D, against the sides of the cylinder C, pass through the gauze covered openings E, F, which are graduated so as to increase the openings as the draft is diminished, until the openings G which are without any netting allows the remaining products of combustion to pass through unobstructed. The sparks, cinders &c. after passing the openings F, will drop into the spark receptacle H, there not being sufficient draft through the openings G to draw them through it except perhaps the very lightest of them. If however they should be drawn through the openings G, the ascending draft outside of the cylinder C, and between it and the shell of the spark chamber, would not be sufficient to carry them up and out of the exit J; and besides, to further prevent or guard against such consequence, a gauze netting I, is placed between the chamber C, and the shell of the spark chamber H, which effectually prevents any such contingency, and the sparks consequently fall from the outside as well as from the inside of the cylinder C, into the spark receptacle H—the communication with it being from both sides of the cylinder. The red arrows in the section, show the direction of the sparks and gases—the lighter portions finding their way out through the openings E and F, and to the exit J, while the heavier portions drop down into the receptacle H, from whence they can be removed through the opening K.

The precise number of openings herein represented, may be varied in size and number to suit the circumstances of the case, and there may be three or more tiers of openings, graduated from fine gauze nettings, to unobstructed openings; leaving sufficient solid surface against which the sparks may strike to deaden them, and give them a downward tendency.

L represents the stay rods for bracing the top of the chimney.

Outside of the spark receptacle, or that part which generally constitutes the outer shell of the stack, we arrange another shell A, at such distance as to form between them an air flue R, for aiding the draft of the chimney which has been impeded by the separation of the sparks, &c. This air flue has an opening or openings at the bottom of the stack, and may have a flaring mouth S, in front, to catch in the air or draft created by the velocity of the locomotive or steam boat to which it may be attached, which after it passes in, becomes highly heated, by the heat of the interior of the stack, and causes it to ascend with great rapidity, as indicated by the black arrows, thus creating another stronger draft, to aid the natural draft of the chimney. The steam may be escaped into the chimney as now done, or may pass into the air flue, as may be found expedient—and the air flue may be divided into two or more flues.

T are braces to aid in supporting the stack.

Over the top of the stack may be placed a cap M, the flange N, of which may project downward to any suitable distance, leaving an open space all around the stack, except in the rear, where a portion of said opening, when the stack is used on any thing in motion, should be closed, to prevent the air from being drawn backward by the eddy in rear of the stack. Through this opening also some additional draft to the chimney may be procured by drawing in a current to aid the others passing up from the bottom of the stack. The cap M, may be secured to the outer case by hinges O, and a clasp P, so that it may be raised to clean out the chambers or nettings or for repairs if found necessary.

Having thus fully described our invention, what we claim therein as new and desire to secure by Letters Patent is—

Combining with a stack or chimney provided with chambers and openings for separating and passing out the smoke and gases, and retaining the sparks, substantially such as herein described, the draft flue around the stack which takes in air at the bottom, and furnishes at the top of the chimney additional draft to supply that impeded by the separation of the sparks, the whole being arranged substantially as herein set forth.

JOSEPH LEEDS.
GEORGE H. OAT, Jr.
ALFRED A. OAT.

Witnesses:
CHARLES D. FREEMAN,
PETER Y. WEAVER.